United States Patent
Beinhofer et al.

(10) Patent No.: US 12,037,194 B2
(45) Date of Patent: Jul. 16, 2024

(54) ROBOT SYSTEM WITH MOTION SEQUENCES ADAPTED TO PRODUCT TYPES, AND OPERATING METHOD THEREFOR

(71) Applicant: TGW Logistics Group GmbH, Marchtrenk (AT)

(72) Inventors: Maximilian Beinhofer, Thalheim bei Wels (AT); Harald Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 875 days.

(21) Appl. No.: 16/978,232

(22) PCT Filed: Mar. 7, 2019

(86) PCT No.: PCT/AT2019/060076
§ 371 (c)(1),
(2) Date: Sep. 9, 2020

(87) PCT Pub. No.: WO2019/169418
PCT Pub. Date: Sep. 12, 2019

(65) Prior Publication Data
US 2021/0009351 A1    Jan. 14, 2021

(30) Foreign Application Priority Data
Mar. 9, 2018 (AT) .............. A 50206/2018

(51) Int. Cl.
*B65G 1/137* (2006.01)
*B25J 9/00* (2006.01)
(Continued)

(52) U.S. Cl.
CPC ............ *B65G 1/137* (2013.01); *B25J 9/0093* (2013.01); *B25J 9/1612* (2013.01); *B25J 13/08* (2013.01);
(Continued)

(58) Field of Classification Search
CPC ................ G05B 2219/40025; B65G 31/00
See application file for complete search history.

(56) References Cited

U.S. PATENT DOCUMENTS

| 4,242,025 A | 12/1980 | Thibault |
| 5,564,893 A | 10/1996 | Tacchi et al. |

(Continued)

FOREIGN PATENT DOCUMENTS

| AT | 511 867 A1 | 3/2013 |
| CN | 201711969 U | 1/2011 |

(Continued)

OTHER PUBLICATIONS

International Search Report in PCT/AT2019/060075, mailed Jul. 17, 2019.

(Continued)

*Primary Examiner* — Timothy R Waggoner
(74) *Attorney, Agent, or Firm* — Collard & Roe, P.C.

(57) ABSTRACT

A robot system includes a robot having a gripping unit for picking and placing down/throwing goods, wherein the goods are differentiated into multiple types with respect to their dimensional stability, compressive stability, flexural rigidity, strength, their absolute weight and/or specific weight. When the goods are manipulated, the robot and/or the gripping unit are controlled depending on the type determined for the goods. Moreover, a method operates the robot system.

40 Claims, 3 Drawing Sheets

(51) Int. Cl.
*B25J 9/16* (2006.01)
*B25J 13/08* (2006.01)
*B25J 15/06* (2006.01)
*G05B 19/4155* (2006.01)
*G06Q 10/087* (2023.01)

(52) U.S. Cl.
CPC ...... *B25J 15/0616* (2013.01); *G05B 19/4155* (2013.01); *G06Q 10/087* (2013.01); *G05B 2219/39561* (2013.01)

(56) References Cited

U.S. PATENT DOCUMENTS

| | | | |
|---|---|---|---|
| 5,605,432 | A | 2/1997 | Fink et al. |
| 6,681,151 | B1 | 1/2004 | Weinzimmer et al. |
| 8,788,086 | B2 | 7/2014 | Franz |
| 9,026,243 | B2 | 5/2015 | Radwallner et al. |
| 9,205,558 | B1 | 12/2015 | Zevenbergen et al. |
| 9,381,645 | B1 | 7/2016 | Yarlagadda et al. |
| 9,452,894 | B2 | 9/2016 | Puchwein et al. |
| 9,457,477 | B1 | 10/2016 | Rublee et al. |
| 9,665,946 | B2 | 5/2017 | Oda |
| 9,751,693 | B1 | 9/2017 | Battles et al. |
| 9,827,677 | B1 | 11/2017 | Gilbertson et al. |
| 9,868,207 | B2 | 1/2018 | Wellman |
| 9,926,138 | B1 * | 3/2018 | Brazeau ............ B25J 5/007 |
| 10,108,194 | B1 | 10/2018 | Russell |
| 10,549,928 | B1 * | 2/2020 | Chavez ............ B25J 9/1687 |
| 10,625,305 | B2 | 4/2020 | Wagner et al. |
| 10,773,839 | B1 | 9/2020 | Talda et al. |
| 10,926,408 | B1 * | 2/2021 | Vogelsong ........... B25J 9/163 |
| 11,514,386 | B1 | 11/2022 | Soles et al. |
| 11,858,743 | B2 | 1/2024 | Bauman et al. |
| 2005/0226711 | A1 | 10/2005 | Schnoor et al. |
| 2006/0182545 | A1 | 8/2006 | Ray et al. |
| 2008/0181753 | A1 | 7/2008 | Bastian et al. |
| 2009/0279999 | A1 | 11/2009 | Faulkner et al. |
| 2010/0221094 | A1 | 9/2010 | Kuehnemann et al. |
| 2011/0170998 | A1 | 7/2011 | Winkler |
| 2011/0264259 | A1 | 10/2011 | Boyer et al. |
| 2013/0041495 | A1 | 2/2013 | Moore et al. |
| 2014/0023461 | A1 | 1/2014 | Schaller et al. |
| 2014/0205403 | A1 | 7/2014 | Criswell |
| 2014/0234066 | A1 | 8/2014 | Mathi et al. |
| 2014/0244026 | A1 | 8/2014 | Neiser |
| 2015/0057793 | A1 | 2/2015 | Kawano |
| 2015/0314439 | A1 | 11/2015 | Wang et al. |
| 2015/0336741 | A1 | 11/2015 | Ahammer et al. |
| 2015/0370239 | A1 | 12/2015 | Pronold |
| 2016/0009493 | A1 | 1/2016 | Stevens et al. |
| 2016/0016311 | A1 | 1/2016 | Konolige et al. |
| 2016/0207195 | A1 | 7/2016 | Eto et al. |
| 2016/0236867 | A1 | 8/2016 | Brazeau et al. |
| 2016/0244262 | A1 | 8/2016 | O'Brien et al. |
| 2016/0297611 | A1 | 10/2016 | Williams et al. |
| 2017/0050315 | A1 | 2/2017 | Sileane |
| 2017/0088360 | A1 * | 3/2017 | Brazeau ............ B25J 9/1664 |
| 2017/0151673 | A1 | 6/2017 | Kobayashi et al. |
| 2017/0322561 | A1 | 11/2017 | Stiernagle |
| 2018/0057263 | A1 | 3/2018 | Beer |
| 2018/0257225 | A1 | 9/2018 | Satou |
| 2019/0102965 | A1 | 4/2019 | Greyshock et al. |
| 2019/0185267 | A1 | 6/2019 | Mattern et al. |
| 2019/0270197 | A1 | 9/2019 | Wagner et al. |
| 2020/0078935 | A1 | 3/2020 | Kimura et al. |
| 2020/0385209 | A1 | 12/2020 | Garcia et al. |

FOREIGN PATENT DOCUMENTS

| | | |
|---|---|---|
| CN | 202640363 U | 1/2013 |
| CN | 205552559 U | 9/2016 |
| CN | 206066477 U | 4/2017 |
| DE | 44 07 324 A1 | 9/1994 |
| DE | 10 2007 005 534 A1 | 8/2008 |
| DE | 10 2015 007 863 A1 | 12/2015 |
| DE | 10 2015 011 527 A1 | 3/2016 |
| DE | 10 2016 008 078 A1 | 1/2018 |
| EP | 0 616 874 A1 | 9/1994 |
| EP | 1 986 165 A1 | 10/2008 |
| EP | 2 315 714 B1 | 10/2012 |
| EP | 2 650 237 A1 | 10/2013 |
| EP | 2 783 799 A2 | 10/2014 |
| EP | 2 923 971 A1 | 9/2015 |
| EP | 3 112 295 A1 | 1/2017 |
| EP | 2 984 007 B1 | 3/2017 |
| EP | 3 248 915 A1 | 11/2017 |
| EP | 3 263 292 A1 | 1/2018 |
| JP | S52-59475 A | 5/1977 |
| JP | H06-39387 U | 5/1994 |
| JP | 2003-181786 A | 7/2003 |
| JP | 56-17512 B2 | 11/2014 |
| JP | 2018-015815 A | 2/2018 |
| WO | 2006/065147 A1 | 6/2006 |
| WO | 2009/094995 A1 | 8/2009 |
| WO | 2012/163666 A1 | 12/2012 |
| WO | 2013/090970 A2 | 6/2013 |
| WO | 2015/118171 A1 | 8/2015 |
| WO | 2016/010968 A1 | 1/2016 |
| WO | 2016/100235 A1 | 6/2016 |
| WO | 2016/138101 A1 | 9/2016 |
| WO | 2017/143367 A1 | 8/2017 |
| WO | 2017/198281 A1 | 11/2017 |
| WO | 2018/006112 A1 | 1/2018 |
| WO | 2018132855 A1 | 7/2018 |

OTHER PUBLICATIONS

International Search Report in PCT/AT2019/060076, mailed Jul. 15, 2020.

International Search Report in PCT/AT2019/060077, mailed Sep. 11, 2019.

International Search Report in PCT/AT2019/060078, mailed Jul. 24, 2019.

Monkman, Gareth J. et al., "Robot Grippers" Weinheim: Wiley-VCH Verlag Gmbh & Co. KGaA, 2007.

* cited by examiner

ROBOT SYSTEM WITH MOTION SEQUENCES ADAPTED TO PRODUCT TYPES, AND OPERATING METHOD THEREFOR

CROSS REFERENCE TO RELATED APPLICATIONS

This application is the National Stage of PCT/AT2019/060076 filed on Mar. 7, 2019, which claims priority under 35 U.S.C. § 119 of Austrian Application No. A50206/2018 filed on Mar. 9, 2018, the disclosure of which is incorporated by reference. The international application under PCT article 21(2) was not published in English.

BACKGROUND OF THE INVENTION

Field of the Invention

The invention relates to a method for controlling a robot in a storage and order-picking system, said robot comprising a gripping unit movable in relation to a robot base, in which the goods are picked from or out of a first goods carrier and are placed down or thrown in/into or on/onto a second goods carrier by means of the gripping unit. Moreover, the invention relates to a robot system with a robot having a gripping unit for picking goods that is movable in relation to a robot base, wherein the robot is designed for picking goods from or out of a first goods carrier and to place down or throw these in/into or on/onto a second goods carrier by means of the gripping unit. Finally, the invention also relates to a storage and order-picking system for picking goods, comprising a storage area for storing goods and a working area for picking/repacking goods using a robot system of the aforementioned type.

Description of the Related Art

A method, a robot system and a storage and order-picking system of the mentioned type are, in general, known. For example, U.S. Pat. No. 9,868,207 B2 discloses a robot for gripping goods in a storage system in this regard. In the course of this, information on gripping the goods can be determined and, in connection with a database, be used for determining a gripping strategy.

The disadvantage of the known methods is that they are comparably inflexible and not very suitable for transferring a large number of different goods. Often specialized systems are used which can only handle a few different and only slightly different types of goods. Many transfer operations in a storage and order-picking system are thus carried out by warehouse staff and/or order pickers, which is disadvantageous for their health in particular with heavy goods.

SUMMARY OF THE INVENTION

It is thus the object of the invention to provide an improved method for controlling a robot in a storage and order-picking system, an improved robot system as well as an improved storage and order-picking system for picking goods. In particular, the disadvantages mentioned above are to be overcome and the activities carried out by a robot system are to be extended.

This object is achieved by means of a method of the initially mentioned type, in which goods are differentiated by one or a combination of the physical parameters: dimensional stability, compressive stability, flexural rigidity, strength, absolute weight and/or specific weight at least into goods of a first type and goods of a second type, prior to picking a good, the type of good is determined, and the mentioned good is picked from or out of the first goods carrier and is placed down or thrown in/into or on/onto the second goods carrier by means of the gripping unit, wherein the robot and/or the gripping unit (in particular a movement of the robot and/or of the gripping unit) is controlled depending on the type determined for the mentioned good.

Further, the object of the invention is achieved by a robot system of the initially mentioned type, which comprises a robot controller configured for instructing the robot to pick said goods from or out of the first goods carrier and to place or throw them in/into or on/onto the second goods carrier, wherein the robot and/or the gripping unit (in particular a motion sequence of the robot and/or the gripping unit) is controlled differently depending on the determined type of said goods.

Finally, the object of the invention is also achieved by an (essentially automated) storage and order-picking system of the initially mentioned type, which comprises a (fully automated) robot system of the aforementioned type, which is in particular connected to the storage area in terms of conveyor technology.

Based on the suggested measures, the suggested method, the suggested robot system and the suggested storage and order-picking system can be used very flexibly and are suitable for transferring a plurality of different goods. Hence, diverse and also very different types of goods can be handled, thus allowing the activities carried out by a robot system to be extended as compared to the prior art. Further, warehouse staff can be relieved in that they have to carry out monotonous reloading operations less often.

In the context of the invention, a "good" in particular is understood as an object that can be handled individually and/or a group of objects that can be handled individually.

The "type" of a good indicates its properties or the kind of a good. To determine the type of a good, a physical property or a group of physical properties can be used as a basis.

For example, the goods can be differentiated by their dimensional stability. The "dimension stability" is a measure of the deformability of a good, i.e. the resistance of a good to deformation. Accordingly, goods with a low dimensional stability are "easily deformable" and goods with a high dimensional stability are "difficult to deform". It is therefore conceivable that goods of the first type are easily deformable and goods of the second type are difficult to deform. Goods of the first type in particular have an elastic modulus of <1.0 GPa and goods of the second type in particular have an elastic modulus of ≥1.0 GPa.

The goods can also be differentiated from one another by their compressive stability. The "compressive stability" is a special form of dimensional stability and a measure for the deformability of a good under a compressive load. Goods with a low compressive stability are "soft/resilient", goods with a high compressive stability are "hard/rigid". It is therefore conceivable that goods of the first type are soft/resilient and goods of the second type are hard/rigid. Goods of the first type in particular have an elastic modulus of <1.0 GPa and/or in particular have a compression spring constant of <0.5 N/cm under central loading. Goods of the second type in particular have a compressive elastic modulus of ≥1.0 GPa and/or in particular have a compression spring constant of ≥0.5 N/cm under central loading.

Furthermore, the goods can be differentiated from one another by their flexural rigidity. The "flexural rigidity" also is a special form of dimensional stability and a measure for the deformability of a good under a bending load. Goods with a low flexural rigidity are "flexurally limp", goods with high flexural rigidity are "flexurally rigid". It is therefore conceivable that goods of the first type are flexurally limp and goods of the second type are flexurally rigid. Goods of the first type in particular have an elastic modulus of <1.0 GPa and/or in particular have a bending spring constant of <0.01 Nm/°. Goods of the second type in particular have an elastic modulus of ≥1.0 GPa and/or in particular have a bending spring constant of ≥0.01 Nm/°.

The strength of a good is a further physical property for differentiating the goods. The "strength" is a measure of the resistance of a product to destruction. Accordingly, goods with a low strength are "fragile" and goods with high strength are "unbreakable". It is therefore conceivable that goods of the first type are unbreakable and goods of the second type are fragile. Goods of the first type in particular have a tensile strength of <100 N/mm$^2$ and goods of the second type in particular have a tensile strength of ≥100 N/mm$^2$. Goods with a high strength are also more stable than goods with low strength and can be stacked higher.

Moreover, the goods can also be distinguished according to their weight. It is therefore conceivable that goods of the first type are light and goods of the second type are heavy. Goods of the first type in particular have a weight of <1 kg and goods of the second type in particular have a weight of ≥1 kg.

The specific weight of the goods is a further physical property for differentiating these. The "specific weight" is the ratio between the weight of a body to its volume. It is therefore conceivable that goods of the first type are light in specific weight and goods of the second type are heavy in specific weight. Goods of the first type can in particular have a specific weight of <1 g/cm$^3$ and goods of the second type can in particular have a specific weight of ≥1 g/cm$^3$.

In a further variant, the goods are additionally differentiated into at least a first and second type according to their size. The "size" of a good can relate to its dimensions, i.e. to the length, width and/or height of a good and/or to its surface and/or to its volume. It is therefore conceivable that goods of the first type are small and goods of the second type are large.

Goods of the first type in particular have a maximum dimension of <0.2 m and/or in particular have a volume of <1 dm$^3$. Goods of the second type in particular have a maximum dimension of ≥0.2 m and/or in particular have a volume of ≥1 dm$^3$.

In a further variant, the goods are additionally differentiated into at least a first and second type according to their geometric shape. It is therefore conceivable that goods of the first type are shaped as desired and goods of the second type have flat boundary surfaces and are in particular cuboid or essentially cuboid. In this regard, it should be noted that goods that are difficult to deform, hard/rigid and/or flexurally rigid usually do not significantly change their geometric shape. Goods that are easily deformable, soft/resilient and/or flexurally limp, by contrast, may significantly change their geometric shape and belong to the first or second type, depending on the type of goods. These goods can thus change their classification over time. An example of such goods is, for example, articles of clothing packed in tightly fitted foil bags. These foil bags give the otherwise rather flexurally limp articles of clothing a certain dimensional stability, which makes such an article of clothing essentially cuboid and therefore easy to stack when it lies on a (flat) surface. If, however, it hangs over the side wall of a loading aid, the article of clothing packed in film can take on a completely different shape, which differs significantly from the cuboid shape.

A "goods carrier" can for example be a loading aid (such as a box, a tray or a container or a pallet) or can be formed by a conveyor (such as a belt conveyor, a roller conveyor or a chain conveyor). However, a "goods carrier" can also be formed by a transport platform (for example on a storage and retrieval unit or an autonomous transport vehicle). In this context the first goods carrier serves as the "source", the second goods carrier serves as the "target". The second goods carrier can for example also be formed by a pivotable flap. In this case, the robot picks a good from or out of the source and places it on the flap. After this, the good can be discharged into a further container, for example by actuating, i.e. elevating, the flap.

A "loading aid", as indicated above, can be formed by a container, for example by a case, by a box or by a cardboard box. In general, a container comprises a container bottom, side walls rising up from it and a loading opening bounded by the side walls. In this regard, it is noted that a tray usually also has side walls and can thus also be understood as a flat container.

In general, the first goods carrier and/or the second goods carrier can be designed as a loading aid or a conveying device.

In a "storage and order-picking system", goods can for example be delivered to an incoming goods department and be taken over and then optionally be repacked and stored in a warehouse. The goods can also be picked according to an order, meaning that they can be removed from the warehouse, combined into an order and provided for transport at the outgoing goods department. As opposed to a manufacturing process, the goods are not substantially changed between the incoming goods department and the outgoing goods department. However, a slight change in shape is possible, in particular in case of non-rigid bodies such as pouches or bags or other resilient packaging, for example from cardboard or plastic materials.

A "motion parameter" of the robot can for example be understood as a speed and/or acceleration with which the gripping unit is moved, in particular its minimum and/or maximum values. A motion parameter can also influence a trajectory. For example, the motion parameter can define the minimum radii and/or maximum radii used in a trajectory. Further examples of motion parameters are e.g. the force, with which a gripping unit grips a good, a vacuum, which is generated by the suction grippers, and so on.

To distinguish the goods at least into a first and a second type, for example a threshold assigned to a physical property, e.g. the weight of the goods, can be used. For example, the threshold can be determined to be 1 kg in this case.

In a variant of the suggested method, a program for controlling the robot and/or the gripping unit (in particular for a motion of the robot and/or the gripping unit) contains at least two program branches, wherein, based on the type of the good to be picked, a program branch intended for said type is run through. In this case, a program for controlling the robot and/or the gripping unit (in particular for a motion of the robot and/or the gripping unit), which contains at least two program branches, is stored in the robot controller, wherein, based on the type of the goods to be picked, a program branch intended for said type is run through. This means that the type of good directly influences the flow of said program. As a result of these measures, the motion patterns intended for the different types of goods can differ in a very complex manner.

In the alternative or in addition to this, it is also conceivable that
- motion parameters for the robot, which are assigned to the physical properties and/or to the types of goods, are stored in a database,
- a motion parameter for the robot is read from the database using the type of goods to be picked, and
- the motion of the robot is controlled using the read motion parameter.

In this variant, the type of good thus influences the motion parameter intended for controlling the robot. For example, a speed and/or an acceleration of the gripping unit can be provided as a motion parameter.

It is conceivable that the suggested measures are used on their own or in combination. Accordingly, the type of good can influence the program flow and/or the motion parameter of the robot system.

A physical property of a good can advantageously be determined with the aid of a sensor system. For this purpose, the sensor system can for example comprise a sensor that directly deter-mines the relevant physical property. Thus, for example a scale can be used for determining the weight of a good. However, the property of a good can also be determined indirectly via the sensor system. A good is identified by means of the sensor system and consequently, a dataset relating to the identified good, which contains the desired property of the good, is read from a database. For example, the compressive stability of the good is assigned to an item number of a good in the respective dataset, and so on. To identify the good (i.e. to for example determined the item number of the good) the sensor system can for example comprise a camera, a barcode scanner and/or an RFID reader.

It is also conceivable that the identification of a good is carried out without the aid of a sensor system of the robot system. For example, a central computer of the storage and order-picking system can know at which position in the storage and order-picking system a good is located. Thus, the central computer can also know which good or which goods are in the operating range of the robot. For example, signals of the drives of the goods carriers, such as signals from rotary encoders in a conveyor roller, can be evaluated to determine the location of the goods within the storage and order-picking system.

The dataset, in which a physical property is assigned to a good, can be contained in a robot database of the robot system and/or in a central database, which is a component of a central computer or is connected to said central computer. Accordingly, the robot system in the latter case comprises an interface with a central computer of a storage and order-picking system, which provides said dataset (the physical property) or from which said dataset (the physical property) is retrieved. For example, a dataset for the weight of a good could look as below:

| Identification number | Weight of good(s) |
|---|---|
| 15689090 | 1 kg |

Consequently, the identified good could be assigned to a first type or to a second type by means of the determined property. In this regard, the goods can explicitly be assigned to one certain type, e.g. to the group of light goods or of heavy goods. An exemplary program flow for the assignment of a good to a certain type using the weight of the goods could for example look as below:

```
IF good > 1 kg THEN
    type of goods = heavy
END
```

If only two types of goods are provided, then the assignment of a good to a certain type using the weight of the goods could for example look as follows:

```
IF good > 1 kg THEN
    type of goods = heavy
OTHERWISE
    type of goods = light
END
```

In case of more than two types of goods, accordingly, multiple IF-THEN assignments can be carried out.

However, controlling the robot can also be carried out based on an implicit assignment of the goods to a certain type, for example by the determined physical property (i.e. for example the determined weight) being compared to a threshold for this property.

In the first case, therefore, the question is whether the good is light or heavy, whereas in the second case the weight determined is used to answer that question. Below, the aforesaid is elucidated using two simple conditions which can be contained in a program flow for controlling the robot:

```
IF good = heavy THEN
    program flow motion control for heavy goods
END
IF weight of good > 1 kg THEN
    program flow motion control for goods with a weight > 1 kg
END
```

The above program flow can also comprise jumps into subprograms. An IF-THEN request can of course also be used to determine a motion parameter of the robot, as is illustrated below using the example of the speed setting for the gripping unit:

```
IF good = heavy THEN
    speed = 1 m/s
END
IF weight of good > 1 kg THEN
    speed = 1 m/s
END
```

The examples are pseudocode segments. In reality, corresponding code segments can of course also be conceived in another language and/or have another structure.

If the goods are explicitly distinguished at least into goods of a first type and goods of a second type, the determination of a physical property of a good is not necessarily required but the type of a good can also be determined without an explicit determination of the respective physical property.

In this regard, a good is in turn identified by means of the sensor system of the robot system or the identification of the good is carried out by means of the central computer, as was elucidated in an example above. Consequently, a dataset relating to the identified good, which contains the desired type of good, is read from a database. For example, the type of compressive stability of the good is assigned to an item number of a good in the respective dataset, i.e. for example "fragile" or "unbreakable", and so on. To identify the good (i.e. to for example determine the item number of the good) the sensor system can comprise a camera, a barcode scanner and/or an RFID reader in this case as well.

The dataset can, in turn, be contained in a robot database of the robot system and/or in a central database, which is a component of a central computer or is connected to said central computer. Accordingly, the robot system, in this case as well, comprises an interface with a central computer of a storage and order-picking system, which provides said dataset (the type of good) or from which said dataset (the type of good) is retrieved. For example, a dataset for the type of a good could look as below:

| Identification number | Type of good(s) |
|---|---|
| 15689090 | heavy |

In this case, the exemplary pseudocode segments already mentioned above, which refer to the type of good, are relevant. As mentioned above, determining the physical property which is used to determine the type of good or the group classification of the good to a type is not necessarily required, as is also made clear by the above code segments.

In the examples above, a value of a motion parameter in a program section and/or code segment of the program was determined for controlling the robot. However, it is also conceivable that the respective motion parameter is stored in a dataset in which the motion parameter is assigned to
an identification of a good or
a property of a good or
a type of a good.

For example, datasets for the speed of the gripper head could accordingly look as below:

| Identification number | Speed |
|---|---|
| 15689090 | 1 m/s |

| Weight of good(s) | Speed |
|---|---|
| 1 kg | 1 m/s |

| Type of good(s) | Speed |
|---|---|
| heavy | 1 m/s |

The respective datasets can, in turn, be contained in a robot database of the robot system and/or in a central database, which is a component of a central computer or is connected to said central computer. Accordingly, the robot system, in this case as well, comprises an interface with a central computer of a storage and order-picking system, which provides said dataset (the motion parameter) or from which said dataset (the motion parameter) is retrieved.

The identification of a good, the determination of a property of a good and the determination of a type of a good can be carried out in the manner already described above. In particular, as mentioned above, a sensor system of the robot system and/or a central computer and/or a central database of the storage and order-picking system can be used for this purpose.

In the examples above, it was assumed that a physical property of a good and/or the type of a good is retrieved from a central controller and/or from a central database, by the aid of which the motion sequence of the robot is consequently influenced. However, it is also conceivable that program sections in the form of code segments are retrieved directly from the central controller and/or the central database, which are then loaded into the robot controller. These program sections or code segments can differ from one another for different properties of goods and/or types of goods and can also be referred to or understood as "applets" (short for "application snippet"). It would also be conceivable that pointers to program sections or code segments, which differ from one another for different properties of goods and/or types of goods, are retrieved from the central controller and/or from the central database.

The loading of program sections or code segments (applets) from a central controller or from a central database into the robot controller of the robot system is advantageous in particular where a plurality of robots having the same or similar tasks and/or being of the same or similar type(s) are used in one storage and order-picking system. Hence, the maintenance of the robots and/or the adaption of the robots to different tasks can be facilitated by these program sections or code segments being maintained centrally and thus changed centrally.

In the alternative, it would also be conceivable that said program sections are stored in a robot database and are loaded into the robot controller for example depending on a property of a good or on a type of a good.

Here, it should be noted that the loading of program sections or code segments (applets) as well as the loading of pointers from a central controller or from a central database of a storage and order-picking system into a robot controller in this storage and order-picking system, as well as the aforementioned advantages can also be useful independently of the features of one aspect of the invention and can thus form the basis for an independent patent application.

Further advantageous designs and further advancements of the invention result from the further embodiments as well as from the description in combination with the figures.

It is advantageous if the gripping unit comprises at least one suction gripper, which—when picking a good of the first type—is activated prior to the contact of the at least one suction gripper with said good, whereas the at least one suction gripper—when picking a good of the second type—is activated after the contact of the at least one suction gripper with said good. Accordingly, the at least one suction gripper, in particular when picking a good having one property or multiple ones of the properties: easily deformable, soft/resilient, flexurally limp, unbreakable, light, light in specific weight, small, is activated prior to the contact of the at least one suction gripper with said good. Thus, the at least one suction gripper, in particular when picking a good having one property or multiple ones of the properties: difficult to deform, hard/rigid, flexurally rigid, fragile, heavy, heavy in specific weight, big, is activated prior to the contact of the at least one suction gripper with said good. In this context, the circumstance that goods of the first type can be sucked in by the suction gripper due to their properties, meaning that they can move towards the suction gripper when a vacuum is applied on the suction gripper, is benefited from. Accordingly, when picking goods of the first type, the suction gripper does not need to be positioned as exactly and/or does not need to move that far towards a good. Such a behavior is not to be expected for goods of the second type, which is why the at least one suction gripper is only activated upon contact with the respective good and remains there for a predetermined time span (e.g. approx. 0.2 secs) to ensure safe suction of the good.

It is further advantageous for the gripping unit to comprise at least one suction gripper and for a contact plane of the at least one suction gripper—when a good of the first type is picked—to be tilted by up to 70° in relation to a gripping surface of the good, whereas—when a good of the second type is picked—said contact plane is tilted by a maximum of 20° in relation to a gripping surface of the good. Accordingly, the at least one suction gripper, in particular when picking a good having one property or multiple ones of the properties: easily deformable, soft/resilient, flexurally limp, unbreakable, light, light in specific weight, small, is tilted by up to 70° in relation to a gripping surface of the good. Thus, the at least one suction gripper, in particular when picking a good having one property or multiple ones of the properties: difficult to deform, hard/rigid, flexurally rigid, fragile, heavy, heavy in specific weight, big, is tilted by a maximum of 20° in relation to a gripping surface of the good. In this context, the circumstance that the goods of the first type are resilient and a gripping surface of the goods, which is not aligned essentially parallel to the contact plane of the suction gripper, can be "pushed into place" when the gripping unit is lowered towards the respective good, is benefited from. Thus, the requirement of adapting the contact plane to a (randomly) defined align-ment of a gripping surface of the good to be picked for each pick of a good is dispensed with, whereby the loading operation or the order-picking operation can be carried out faster than possible in the prior art. A gripping surface of a good of the second type, however, can usually not be pressed into place due to the special physical properties, which is why the contact plane of the at least one suction gripper is aligned in parallel or essentially in parallel to a gripping surface of the good when picking a good of the second type.

Moreover, it is advantageous for a collision of the gripping unit with another good than the good to be picked to be prevented if the other good is a good of the second type and to be allowed for if the other good is a good of the first type. Accordingly, a collision, in particular with a good having one or multiple ones of the properties: difficult to deform, hard/rigid, flexurally rigid, fragile, heavy, heavy in specific weight, big, is prevented, whereas a collision, in particular with a good having one or multiple ones of the properties: easily deformable, soft/resilient, flexurally limp, unbreakable, light, light in specific weight, small, is allowed for. In this context, the circumstance that the goods of the first type usually are less sensitive to collisions with the gripping unit due to their properties. Therefore, the effort for positioning the gripping unit can be kept very low, which results in shorter cycle times. In contrast, special care is taken not to damage goods of the second type. The suggested measures thus provide a good compromise for the effort required to position the gripping unit.

Moreover, it is advantageous if the maximum speed of the gripping unit is higher for goods of the first type than for goods of the second type and/or the maximum acceleration of the gripping unit is higher for goods of the first type than for goods of the second type. Accordingly, a good, which in particular has one property or multiple ones of the properties: easily deformable, soft/resilient, flexurally limp, unbreakable, light, light in specific weight, small, is moved faster and/or accelerated more strongly than a good which in particular has one property or multiple ones of the properties: difficult to deform, hard/rigid, flexurally rigid, fragile, heavy, heavy in specific weight, big. In this context, the circumstance that the goods of the first type usually are less sensitive and can be held more securely by the gripping unit than goods of the second type due to their properties is made use of. Hence, a good compromise between quick processing of the loading operation and the occurring errors (for example falling of a good from the gripping unit or damage to a good) is achieved.

Moreover, it is advantageous if a specific target position in or on the second goods carrier is calculated for goods of the second type, whereas a target region with multiple possible target positions in or on the second goods carrier is calculated for goods of the first type. Accordingly, for a good in particular having one or multiple ones of the properties: difficult to deform, hard/rigid, flexurally rigid, fragile, heavy, heavy in specific weight, big, a specific target position is calculated, whereas for a good in particular having one or multiple ones of the properties: easily deformable, soft/resilient, flexurally limp, unbreakable, light, light in specific weight, small, a target region with multiple possible target positions is allowed for. In this context, the circumstance that there is a relatively high probability that goods of the first type are comparatively strongly deformed when discarded or dropped, is made use of. An ex-cessive effort for positioning goods of the first type thus seems superfluous and is kept low according to the suggested measure. Goods of the second type in contrast deform less and are therefore easy to stack, which is why exact positioning is useful. By the suggested measures, the computing time for calculating a target position is kept low without dispensing with the possibility of stacking goods of the second type.

Moreover, it is particularly advantageous if a good of the first type lying adjacent to a side wall of the loading aid is pressed against said side wall when it is picked, whereas a good of the second type lying adjacent to a side wall of the loading aid is removed from the loading aid without any pressure on said side wall when it is picked. Accordingly, a good in particular having one property or multiple ones of the properties: easily deformable, soft/resilient, flexurally limp, unbreakable, light, light in specific weight, small, is pressed against the side wall of the loading aid when it is picked. Thus, a good in particular having one property or multiple ones of the properties: difficult to deform, hard/rigid, flexurally rigid, fragile, heavy, heavy in specific weight, big, is removed without any pressure on the side wall of the loading aid. By the suggested measures, for goods of the first type a gripping surface can be "pressed into place" for the gripping unit and be aligned such that it can be easily gripped by the gripping unit. This may be faster than aligning the gripping unit precisely to an existing gripping surface. For goods of the second type in contrast there usually is no possibility to "press into place" the gripping surface or to deform an existing gripping surface as desired. Thus, the suggested measures achieve a good compromise regarding the time required for picking a good.

Moreover, it is particularly advantageous if goods of the first type are thrown into or onto the second goods carrier, whereas goods of the second type are placed in or on the second goods carrier. Accordingly, a good in particular having one property or multiple ones of the properties: easily deformable, soft/resilient, flexurally limp, unbreakable, light, light in specific weight, small, is thrown into or onto the second goods carrier. Thus, a good in particular having one property or multiple ones of the properties: difficult to deform, hard/rigid, flexurally rigid, fragile, heavy, heavy in specific weight, big, is placed in or on the second goods carrier. In this regard, the circumstance that goods of the first type are on the one hand relatively in-sensitive, that on the other hand observing a precise target position is difficult anyway and is less decisive for optimizing the packing density in the second goods carrier, is made use of. In contrast to this, goods of the second type are comparatively sensitive to damage, and observing a precise target position is comparatively easy and useful due to the possibility of stacking.

In the context above a good of the first type can be moved vertically above a target position calculated for the good or vertically above a target region calculated for the good by means of the robot and then be released. By throwing the goods into or onto the second goods carrier, the loading operation can be configured particularly fast, since lowering the gripping unit into or onto the second goods carrier, as required when placing goods down, is dispensed with. Moreover, the effort for calculating the position of the gripping unit at which the goods are released is kept very low in this embodiment variant.

However, it is also conceivable that a good of the first type is moved to a releasing position by means of the robot and released there, said position being located vertically above and laterally beside a target position calculated for the good or vertically above and laterally beside a target region calculated for the good, as well as at the starting point of a trajectory parabola leading to said target position/into said target region, for the calculation of which at least the speed of motion and the direction of motion of the gripping unit at the releasing position are taken into consideration. By the suggested measures, the path which the gripping unit must travel to throw a good can be further reduced. In particular, the direction of motion of the gripping unit at the releasing position is directed horizontally or obliquely upwards, whereby a good can be thrown relatively far. The loading operation or order-picking operation can thus be significantly accelerated as compared to the prior art by means of the suggested measures.

At this point, it should be noted that the measures mentioned above can also be independent of the features according to one aspect of the invention and can thus form the basis for an independent patent application.

Furthermore, it is particularly advantageous if unintended dropping of the goods collected picked by the gripping unit as well as unintended placing down/throwing of a good outside the tolerance region around the calculated target position of said good is assessed as an error, and the speed and/or acceleration of the gripping unit is reduced if the number of errors per time unit exceeds a first settable threshold and/or is increased if the number of errors per time unit comes below a second settable threshold. Hence, the method for loading/order-picking of goods can be adjusted adaptively to changing conditions. To do so, properties of goods and their suitability for being picked by the gripping unit do not need to be intricately determined but the circumstance that this suitability can be read from the temporal rate of occurring errors is made use of. Thus, an optimum for the loading speed and/or the order-picking speed at the set error rate is always achieved.

At this point, it should be noted that the measures mentioned above can also be independent of the features according to one aspect of the invention and can thus form the basis for an independent patent application.

It is favorable if goods of the first type and goods of the second type are picked and placed down/thrown using the same gripping unit. Hence, time for changing the gripping unit can be saved and loading/order-picking of goods can be carried out quickly.

Moreover, it is favorable if, according to an order, the goods
- are transported to the robot with the aid of the first goods carrier,
- are transferred from or out of the first goods carrier into or onto the second goods carrier with the aid of the robot, and
- are transported away from the robot with the aid of the second goods carrier.

In this variant, the goods are transported to the robot, for example directly on a belt conveyor, a roller conveyor or a chain conveyor, and/or with a loading aid on a belt conveyor, a roller conveyor or a chain conveyor. Thus, the robot can statically remain in one place. However, in general, it would also be conceivable that the robot is designed as a mobile robot, in particular as a mobile jointed-arm robot or as a mobile gantry robot. For example, the robot can be in-stalled on an autonomous transport vehicle (automated guided vehicle, in short "AGV").

As already mentioned above, a sensor system can comprise a camera, a barcode scanner, an RFID reader and/or a scale. Moreover, it is favorable for the sensor system to comprise a room depth sensor and/or a laser scanner and/or an ultrasonic sensor. By means of these sensors, the location and position of a good in or on a goods carrier can be determined and used as a reference for gripping by the gripping unit. By means of a camera (stereo camera), a room depth sensor, a laser scanner or an ultrasonic sensor, a three-dimensional image of the good lying in or on the goods carrier can be captured. However, a three-dimensional image can also be generated from multiple two-dimensional images captured from different angles. These two-dimensional images can, for example, come from stereometrically arranged cameras or can also be captured during a relative movement between the goods and the camera. In this regard, the (individual) camera can move in relation to the non-moving good or vice versa. By the three-dimensional detection of the goods lying in or on the goods carrier, a surface structure of the goods can be detected as well and the suitability for gripping by the gripping unit can be determined. For example, highly convex surfaces are less suitable for gripping by a suction gripper, whereas plane surfaces are particularly well-suited for gripping by a suction gripper. A camera is in particular also suited for capturing a surface character of the goods to be picked, for example an imprint on packaging.

It is advantageous for the gripping unit to comprise at least one suction gripper. Suction grippers are suited for quickly picking goods with different properties, for example both for manipulating more or less rigid bodies (for example boxes, cartons and plastic boxes) and for manipulating resilient and in particular flexurally limp bodies (for example sacks or bags filled with objects).

At this point, it should be noted that the suggested method and/or the suggested robot are generally (i.e. not only in combination with suction grippers) be used both for picking cuboidal goods, as well as for irregularly shaped goods, such as sacks or bags. Both cuboidal goods and irregularly shaped goods can be formed by an object that can be handled individually and/or be formed by a group of objects that can be handled individually. In concrete terms, a good may therefore take the form of a cardboard or plastic box, which is for example filled with multiple objects. Likewise, a good may take the form of a sack or a bag which is filled with multiple objects. The method and/or the robot system according to the invention is particularly well-suited for goods in the form of foil bags, in particular in the form of so-called "polybags" and/or "plastic bags" made from polyethylene or polypropanol. Such foil bags are predominantly used in the textile industry and are for example used for packaging T-shirts, shirts and the like. Often, such foil bags are also used in the shoe industry or in the food industry.

Moreover, it is advantageous for the robot to be designed as a jointed-arm robot or a gantry robot. These designs are proven and tested means for manipulating goods and are available on the market in a wide variety of types.

Finally, it is advantageous if the working area of the storage and order-picking system is designed for fully automated order-picking of goods, and a first conveying device for transporting goods in or on first goods carriers (storage loading aids, in particular containers) is arranged between the storage area and the robot in the working area, and/or a second conveying device for transporting goods in or on second goods carriers (order loading aids, in particular cardboard boxes) is provided between the storage area and the robot in the working area, wherein the robot is designed for picking at least one good from or out of the first goods carrier (storage loading aid, in particular container) for an order and to place or throw the at least one good in/into or on/onto the second goods carrier (order loading aid, in particular cardboard boxes) for this order. Hence, an order-picking operation can be carried out particularly efficient and fast.

At this point, it should be noted that the embodiment variants disclosed for the method and the advantages resulting therefrom can likewise refer to the disclosed device and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclo-sures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, are to be analogously transferred to the new position.

Figure 1:
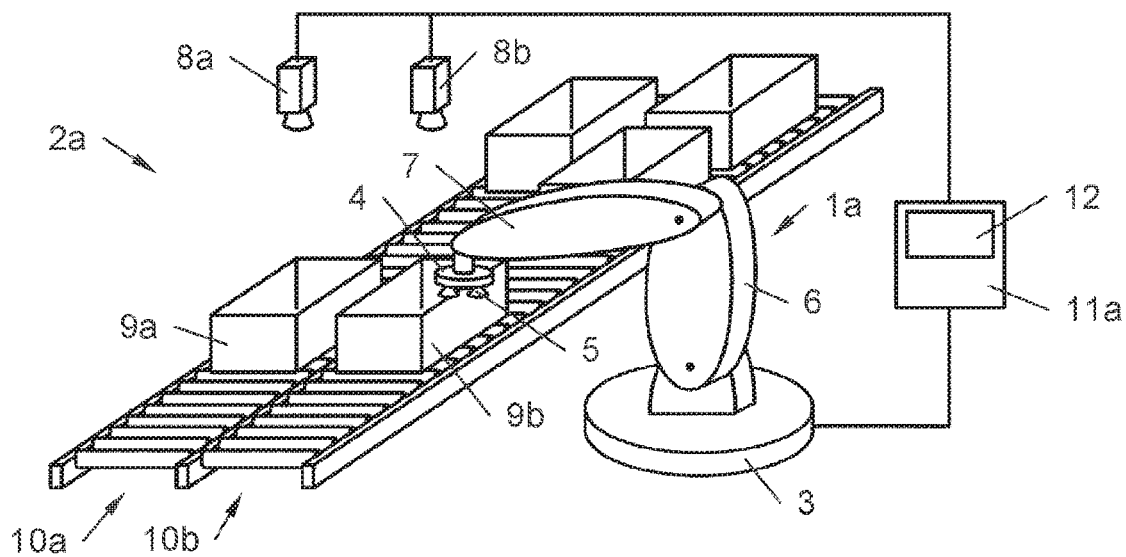
FIG. 1 a first simplified example of a robot system having a robot and a stationarily in-stalled camera system in an oblique view.

FIG. 1 shows a robot 1a in a robot system 2a. The robot 1a comprises a gripping unit 4 which is movable in relation to a robot base 3 and which comprises three suction grippers 5 spaced apart from one another in this example. The gripping unit 4 is connected to the robot base 3 in an articulated manner via a robot arm comprising two arm segments 6 and 7. Moreover, FIG. 1 shows a sensor system 8a, 8b, which serves for the detection of the goods carriers 9a and 9b as well as the goods lying therein and, in the present example, comprises two cameras 8a, 8b. However, the goods are not visible in FIG. 1 since they are stored in the goods carriers 9a and 9b, which are designed as containers in this example. The container 9a is a source container from which goods are picked/removed by the gripping unit 4, and the container 9b is a target container, into which goods are placed down/thrown by the gripping unit 4.

The cameras 8a, 8b are arranged above the containers 9a and 9b and are each designed as a stereo camera in this example. Accordingly, the cameras 8a, 8b detect a three-dimensional image of the inside of at least the containers 9a and 9b and the goods stored therein. In general, it would also be possible that merely the camera 8a (stereo camera) is provided above the container 9a or merely the camera 8b (stereo camera) is provided above the container 9b. Furthermore, it is conceivable that merely one common camera 8a (stereo camera) is provided for the containers 9a and 9b. Although stereo cameras are used in a preferred embodiment, the cameras 8a, 8b can also be designed as a camera for detecting a two-dimensional image of the inside of at least the containers 9a and 9b and the goods stored therein.

The arrangement shown in FIG. 1 further comprises a conveying device for transporting the containers 9a, 9b to the robot system 2a and for transporting the containers 9a, 9b away from the robot system 2a. In particular, the conveying device comprises a first conveying path 10a for transporting the containers 9a, 9b to the robot system 2a and a second conveying path 10b for transporting the containers 9a, 9b away from the robot system 2a.

Finally, the arrangement shown in FIG. 1 also comprises a robot controller 11a, which is connected to the camera 8a, 8b and to the robot 1a and servers for controlling the movement of the gripping unit 4 according to a predefined loading or order-picking operation. The robot controller 11a moreover comprises an optional robot database 12 in the present example.

Figure 2:
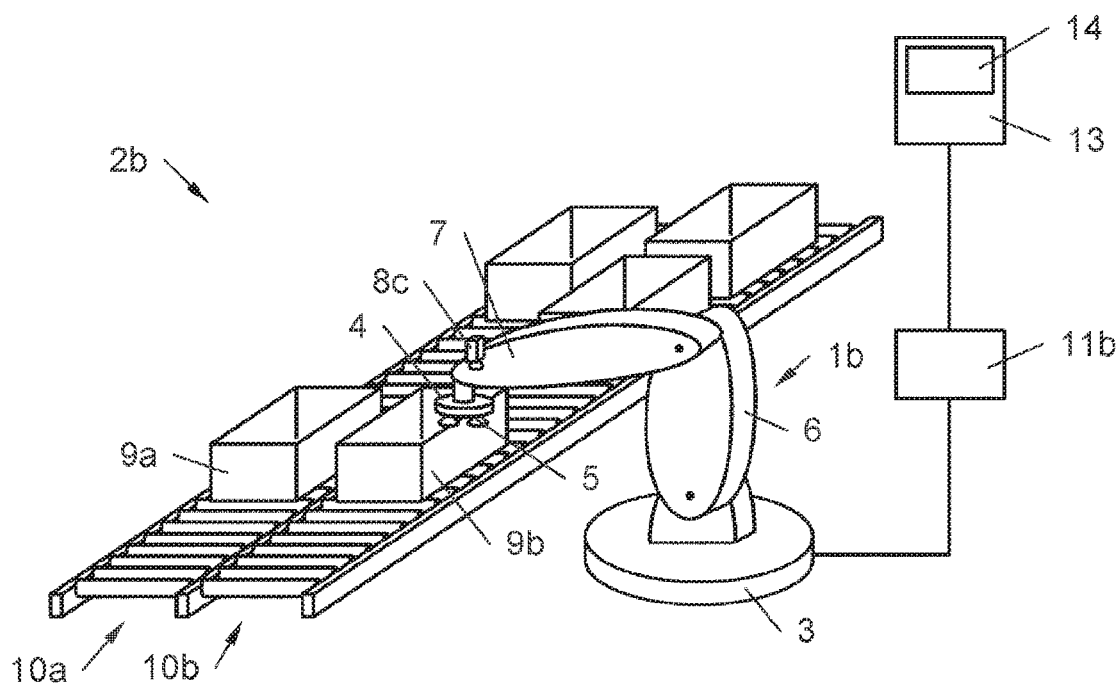
FIG. 2 similar as in FIG. 1, but with a movable camera system having a camera mounted on a robot arm segment of the robot.

FIG. 2 shows a robot system 2b which is very similar to the robot system 2a shown in FIG. 1. In contrast, however, no cameras 8a, 8b are arranged above the containers 9a and 9b, but a single camera 8c is arranged directly on the second arm segment 7 of the robot 1b. This camera 8c is connected to a robot controller 11b (connection not shown). Furthermore, the camera 8c can, in turn, be designed as a stereo camera, to detect a three-dimensional image of the containers 9a and 9b as well as the goods stored therein, for example by the camera 8c being moved above the container 9a or above the container 9b by means of the robot 1a and an image being detected there. However, it would also be conceivable that the camera 8c is designed merely for detecting a two-dimensional image, and a three-dimensional image of the containers 9a and 9b as well as of the goods stored therein is generated by detecting multiple two-dimensional images during a movement of the camera 8c and subsequent calculation of the three-dimensional image.

A further difference of the robot system 2b to the robot system 2a of FIG. 1 consists in that the robot controller 11b is connected to a central computer 13, which comprises an optional central database 14.

At this point, it should be noted that the connection to the central computer 13 and/or to the central database 14 shown in FIG. 2 can also be used in the robot system 2a of FIG. 1. In particular, both the robot database 12 and the central database 14 can be provided. Of course, it is also conceivable that (merely) the robot database 12 is used in the robot system 2b of FIG. 2. At this point, it should also be noted that the camera 8c can also be combined with the cameras 8a . . . 8d of the robot system 1a of FIG. 1.

Figure 3:
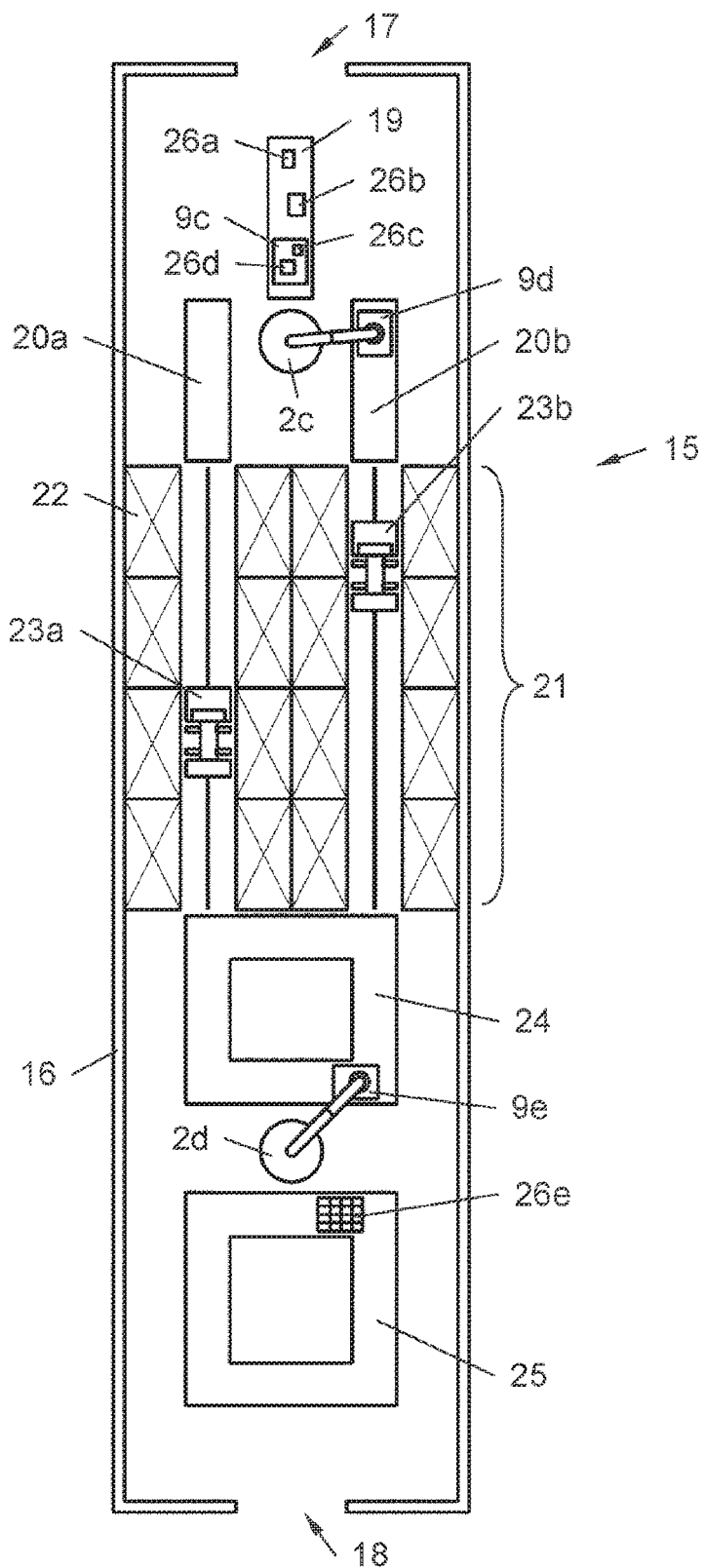
FIG. 3 a schematically shown example of a storage and order-picking system in a top view.

FIG. 3 shows a storage and order-picking system 15 comprising a building 16 as well as a gate at an incoming goods department 17 and a gate at an outgoing goods department 18. In the region of the incoming goods department 17, there is a first conveying path 19 and two second conveying paths 20a and 20b. The first conveying path 19 connects the incoming goods department 17 to the robot system 2c. The two second conveying paths 20a and 20b connect the robot system 2c to a storage area 21, which comprises multiple storage racks 22 as well as storage and retrieval units 23a and 23b, which move in rack aisles running between the storage racks 22. At that end of the rack aisles, which is opposite to the second conveying paths 20a and 20b, there is a third conveying path 24, which is designed annularly and leads to a further robot system 2d in the present example. A fourth conveying path 25, which connects the robot system 2d to the outgoing goods department 18 in terms of conveyor technology, is arranged in the operating range of the robot system 2d as well.

The loading aids 9a . . . 9e shown in FIGS. 1 to 3 are designed as containers, concretely for example as cardboard boxes, cartons or boxes. The container 9a . . . 9e in general comprises a container bottom, side walls rising up from it and a loading opening bounded by the side walls. However, generally, it is also conceivable that the loading aids 9a . . . 9e used in the presented method are designed as pallets or trays. Since a tray usually has (low) side walls, it can also be understood as a container.

Moreover, the suggested method and/or the suggested robot system 2a . . . 2d as well as the suggested storage and order-picking system 15 are not only suited for the manipulation of more or less cuboidal goods 26a . . . 26e, but also for the manipulation of irregularly shaped goods 26a . . . 26e.

At this point, it should also be noted that robot controllers 11a and 11b intended for the robot systems 2c and 2d are also present in the storage and order-picking system 15, are, however, not explicitly shown in FIG. 3. This similarly applies to the robot database 12, the central computer 13 and the central database 14, which can also be present in the storage and order-picking system 15, are, however, not explicitly shown in FIG. 3.

The function of the arrangements shown in the figures is now explained in detail below:

FIGS. 1 and 2 show the process when loading goods 26a . . . 26e from a first goods carrier 9a (source container) into a second goods carrier 9b (target container) with the aid of the gripping unit 4. The goods carriers 9a and 9b formed as box-shaped containers are transported to the robot 1a, 1b by means of the conveying devices for the loading operation and transported away from the robot 1a, 1b after the loading operation. However, the transport of the goods 26a . . . 26e with the aid of loading aids 9a and 9b is no necessary requirement, but the goods 26a . . . 26e can also be transported directly on the conveying devices if these for example comprise a belt conveyor, a modular belt conveyor and the like as the first conveying path 10a and a belt conveyor, a modular belt conveyor and the like as the second conveying path 10b. Of course, roller conveyors 10a and 10b can be provided as well. Likewise, other loading aids, such as trays or cardboard boxes, can be provided in place of the containers 9a and 9b.

If in the region of the robot system 2a . . . 2d loading aids (containers, trays, cardboard boxes) from which or out of which goods 26a . . . 26e are removed by means of the suction grippers 5, are used as first object carriers 10a, the (source) loading aids can advantageously be loaded with goods 26a . . . 26e of just one type or be loaded compartmentalized with goods 26a . . . 26e of just one type. For example, a first loading aid contains the good "A", a second loading contains the good "B" and so on. As opposed to this, it is also possible that a loading aid is di-vided into multiple receiving compartments by means of dividing walls and can accommodate different goods "A", "B", wherein a good "A" can be accommodated in the first receiving compartment and a good "B" can be accommodated in the second receiving compartment.

In general, the goods 26a . . . 26e are differentiated by one of or a combination of the physical parameters: dimensional stability, compressive stability, flexural rigidity, strength, absolute weight and/or specific weight at least into goods 26a . . . 26e of a first type and goods 26a . . . 26e of a second type. Hence, the goods 26a . . . 26e can for example be differentiated into easily deformable and difficult to deform goods 26a . . . 26e, soft/resilient and hard/rigid goods 26a . . . 26e, flexurally limp and flexurally rigid goods 26a . . . 26e, unbreakable and fragile goods 26a . . . 26e, light and heavy goods 26a . . . 26e, light in specific weight and heavy in specific weight goods 26a . . . 26e as well as into small and large goods 26a . . . 26e.

Before a good 26a . . . 26e is picked, its type is determined. Then, said good 26a . . . 26e is picked from or out of the first goods carrier 9a and is placed down or thrown in/into or on/onto the second goods carrier 9b by means of the gripping unit 4. In this regard, the robot 1a, 1b and/or the gripping unit 4, in particular a motion of the robot 1a, 1b and/or of the gripping unit 4, is controlled depending on the type determined for the mentioned good 26a . . . 26e with the aid of the robot controller 11a, 11b.

To distinguish the goods 26a . . . 26e at least into a first and a second type, for example a threshold assigned to a physical property, e.g. the weight of the goods 26a . . . 26e, can be used. For example, the threshold can be determined to be 1 kg in this case.

In a variant of the suggested method, a program for controlling the robot 1a, 1b and/or the gripping unit 4 which is executed in the robot controller 11a, 11b contains multiple program branches, which are run through depending on a physical property or a type of the goods 26a . . . 26e. For example, the program flow can be controlled using an IF-THEN condition (IF-ELSE condition), as is indicated below by way of example

```
IF good = heavy THEN
...
END
IF weight of good > 1 kg THEN
...
END
```

In the alternative or in addition to this, the motions of the robot 1a, 1b can also be influenced by means of motion parameters. A speed and/or an acceleration of the gripping unit 4 can for example be provided as motion parameters. The selection of such a motion parameter can, in turn, be carried out using an IF-THEN condition, as shown below using the example of the speed setting for the gripping unit 4:

```
IF good = heavy THEN
    speed = 1 m/s
END
IF weight of good > 1 kg THEN
    speed = 1 m/s
END
```

It is also conceivable that a motion parameter for the robot 1a, 1b is stored in the form of a data set, wherein the motion parameter is assigned to an identification of the goods 26a . . . 26e, to a physical property of the goods 26a . . . 26e or to a type of the goods 26a . . . 26e, as is shown below by way of example:

| Identification number | Speed |
|---|---|
| 15689090 | 1 m/s |

| Weight of good(s) | Speed |
|---|---|
| 1 kg | 1 m/s |

| Type of good(s) | Speed |
|---|---|
| heavy | 1 m/s |

The respective data sets can be stored in the robot database 12 and/or in the central database 14.

The type of a good 26a . . . 26e can for example be defined using a physical property determined for this good 26a . . . 26e. An exemplary program flow for the assignment of a good 26a . . . 26e to a certain type using the weight of the goods could for example look as below:

```
IF good > 1 kg THEN
    type of goods = heavy
END
```

A physical property of a good 26a . . . 26e, for example the size of a good 26a . . . 26e, can be detected directly via the sensor system, i.e. in the present example using the cameras 8a, 8b. Then, again, the type of the goods 26a . . . 26e can be determined.

However, it is also conceivable that the property of a good 26a . . . 26e or the type of a good 26a . . . 26e is determined via the identification of the good 26a . . . 26e. In this regard, a good 26a . . . 26e is identified with the aid of the sensor system 8a, 8b (which for this purpose for example comprises a barcode scanner or an RFID reader) and the assigned physical property and/or the assigned type is determined with the aid of a data set. For example, a data set could have the following structure:

| Identification number | Weight of good(s) |
|---|---|
| 15689090 | 1 kg |

| Identification number | Type of good(s) |
|---|---|
| 15689090 | heavy |

The respective data sets can, again, be stored in the robot database 12 and/or in the central database 14.

However, it is also conceivable that a physical property of the goods 26a . . . 26e, a type of the goods 26a . . . 26e or an identification of the goods 26a . . . 26e is determined with the aid of a central computer 13, in concrete terms by the central computer 13 knowing which goods 26a . . . 26e are in the operating range of the robot 1a, 1b. For example, this can be done via position encoders in the conveyor rollers, which are used in the conveyor devices. Via these position encoders, the position of a good 26a . . . 26e on the first and second conveying paths 10a, 10b of the conveying device and/or in the storage and order-picking system 15 can be determined and thus also their physical properties, their type and/or their identification.

It is further conceivable that program sections or code segments (applets) are retrieved from the central controller 13 and/or the central database 14, which are then loaded into the robot controller 11a, 11b. These program sections or code segments can differ from one another for different properties of goods and/or types of goods. It would also be conceivable that pointers to program sections or code segments, which differ from one another for different properties of goods and/or types of goods, are retrieved from the central controller 13 and/or from the central database 14.

At this point, it should be noted that the measures suggested above for determining a physical property of a good 26a . . . 26e, a type of a good 26a . . . 26e, an identification of a good 26a . . . 26e and/or a motion parameter of a robot 1a, 1b as well as the measures for controlling the program flow for the robot 1a, 1b can be applied individually as well as in any desired combinations.

For example, the suction gripper 4 can be activated before or after contact of the suction gripper 4 with the goods 26a . . . 26e depending on the type of the goods 26a . . . 26e when a good 26a . . . 26e is picked. It is further conceivable that a contact plane of the suction gripper 4 can be tilted to different extends in relation to a gripping surface of the good 26a . . . 26e depending on the type of the goods 26a . . . 26e when a good 26a . . . 26e is picked (also see FIG. 4). In a further variant, a collision of the gripping unit 4 with another good than the good 26a . . . 26e to be picked is prevented or allowed depending on the type of the other goods 26a . . . 26e. In yet another variant, the maximum speed of the gripping unit 4 and/or the maximum acceleration of the gripping unit 4 is selected depending on the type of the good 26a . . . 26e. Moreover, it is conceivable that depending on the type of a good 26a . . . 26e, a target position or a target region for placing down and/or throwing a good 26a . . . 26e is calculated (also see FIG. 6). In a further variant, a good 26a . . . 26e is pressed against the side wall of a loading aid 9a, 9b while it is picked or removed from the loading 9a, 9b without pressure on said side wall depending on the type of the good 26a . . . 26e (also see FIG. 5). In a further variant, the goods 26a . . . 26e are thrown or placed down onto/on the second goods carrier 9b depending on the type of the good 26a . . . 26e (also see FIG. 6).

It is also conceivable that a trajectory for the gripping unit 4 is changed based on the type of a good 26a . . . 26e. For example, rather soft/round motions can be provided for goods 26a . . . 26e of the second type (meaning that the trajectory has comparably large radii), whereas the trajectory of the gripping unit 4 for goods 26a . . . 26e of the first type can also have narrower radii.

It is also conceivable that large goods 26a . . . 26e are elevated higher above a side wall of a loading aid 9a, 9b, in particular if they are easily deformable, soft/resilient and/or flexurally limp, than small goods 26a . . . 26e, in particular if they are difficult to deform, hard/rigid and/or flexurally rigid.

FIG. 3 shows a fairly more complex arrangement, in specific terms a storage and order-picking system 15. In this regard, goods 26a . . . 26e are delivered to the incoming goods department 17, loaded onto the first conveying path 19, transferred from the first conveying path 19 to the second conveying paths 20a and 20b by the robot system 2c and stored in the storage racks 22 by means of the storage and retrieval units 23a and 23b. The first conveying path 19 in this operation acts as the first goods carrier and/or the source, whereas the second conveying paths 20a and 20b in this operation act as the second goods carrier and/or the target.

When a picking order is to be processed, the goods 26a . . . 26e assigned to the order are removed from at least one storage rack 22 with the aid of at least one storage and retrieval unit 23a and 23b and transferred to the third conveying path 24. Then, the goods 26a . . . 26e are transported to the robot system 2d with the aid of the third conveying path 24 and transferred from the third conveying path 24 to the fourth conveying path 25 by said robot system 2d and are lastly transported to the outgoing goods department 18 with the aid of the fourth conveying path 25. The third conveying path 24 in this operation acts as the first goods carrier and/or the source, whereas the fourth conveying path 25 in this operation acts as the second goods carrier and/or the target.

As can be seen from FIG. 3, the goods 26a, 26b and 26e are transported directly on the conveying paths 19, 20a, 20b, 24 and 25 acting as goods carriers, whereas the goods 26c and 26d are transported with the aid of loading aids 9c . . . 9e, which accordingly also act as goods carriers. Thus, FIG. 3 shows a mixed type of transport. It would certainly also be conceivable that the goods 26a . . . 26e are transported solely on the conveying paths 19, 20a, 20b, 24 and 25 acting as goods carrier or solely with the aid of the loading aids 9c . . . 9e.

Of course, the design and arrangement of the conveying paths 19, 20a, 20b, 24 and 25 in FIG. 3 is to be considered illustrative and other formations and arrangements of the mentioned conveying paths 19, 20a, 20b, 24 and 25 are also conceivable. In particular, an annular conveying path could be arranged at the incoming goods department 17, or linear conveying paths could be provided at the outgoing goods department 18. The conveyor connection of the robot system 2c and 2d to the incoming goods department 17, to the storage area 21 and to the outgoing goods department 18 is not necessarily established via stationary conveying means, as shown in FIG. 3, but could also take place in whole or in part via autonomous transport vehicles (in particular autonomous floor conveyors), whose loading platforms then also serve as goods carriers.

It would further be conceivable that the goods 26a . . . 26e are loaded directly onto the storage and retrieval units 23a and 23b by the robot system 2c or are taken over directly from the storage and retrieval units 23a and 23b by the robot system 2d. In this case, the loading platforms of the storage and retrieval units 23a and 23b also serve as goods carriers.

At this point, it should also be noted that the robots 1a and 1b do not necessarily have to be designed as jointed-arm robots, but can also be designed for example as gantry robots.

It should also be noted that the goods 26a . . . 26e may be arranged in or on the first goods carrier 9a, 9c, 9e, 10a, 19, 24 next to each other, on top of each other, standing upright or lying down, thus disordered (chaotic) and/or in a random arrangement.

It should further be noted that the sensor system can not only comprise cameras 8a . . . 8c, but al-ternatively or additionally also a barcode scanner, an RFID reader, a scale, a room depth sensor, a laser scanner and/or an ultrasonic sensor. With the aid of these sensors, in particular, a three-dimensional image of the goods 26a . . . 26e lying in or on a goods carrier (for example in the containers 9a . . . 9e or on the conveying paths 10a and 10b) can be detected.

In general, by the three-dimensional detection a surface structure of the goods 26a . . . 26e can be detected and the suitability for gripping by means of the suction grippers 5 can be determined. For example, highly convex surfaces are less suitable for gripping, whereas plane surfaces are particularly well grippable.

Figure 4:
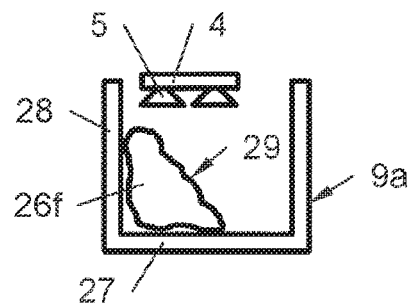
FIG. 4 an example in which the gripping unit is strongly tilted in relation to a gripping surface of the good.

FIG. 4 shows an example of how a contact plane of the suction grippers 5 can be strongly tilted in relation to a gripping surface 29 of the goods 26f of the first type when the goods 26f are picked. In concrete terms, FIG. 4 shows a loading aid 9a having a bottom 27 and side walls 28 rising up from said bottom 27. A good 26f with an obliquely aligned gripping surface 29 is located in the loading space of the loading aid 9a. The angle to the horizontal amounts to approx. 60°. Despite the strongly tilted gripping surface 29 of the good 26f, the contact plane of the suction gripper 5 remains aligned horizontally when picking the good 26f. Due to the fact that goods 26f of the first type are resilient, the gripping surface 29 is adapted to the contact plane of the suction gripper 5 when the gripping unit 4 is lowered and lastly aligns to be essentially horizontal. Since, when the goods 26f are picked, the contact plane of the suction gripper 5 is not aligned in parallel to their gripping surfaces 29, the loading operation or order-picking operation can be carried out quickly.

Figure 5:
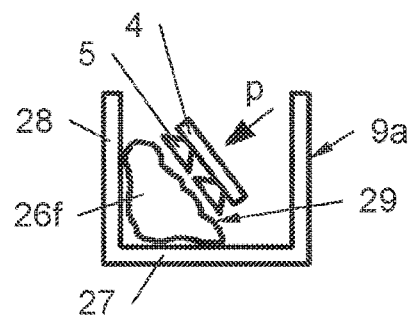
FIG. 5 an example in which a good is pressed against the side wall of a loading aid while it is picked, and FIG. 6 an example for throwing a good into a second goods carrier along a trajectory parabola.

FIG. 5 shows an example of how a good 26f of the first type can be pressed against the side wall of a loading aid 9a when it is picked. In concrete terms, FIG. 5, in turn, shows a loading aid 9a having a bottom 27 and side walls 28 rising up from said bottom 27. A good 26f, which is positioned adjacent to the side wall 28 and has an obliquely aligned gripping surface 29, is located in the loading space of the loading aid 9a. The angle to the horizontal again amounts to approx. 60°. However, in this example, the contact plane of the suction gripper 5 is aligned essentially in parallel to the gripping surface 29 when the good 26f is picked and thus also encloses an angle of approximately 60° to the horizontal. In order to facilitate picking the good 26f, the good 26f can be pressed against the side wall 28 with the pressure p at least when it is picked. It would further be conceivable that the good 26f is also pressed against the side wall 28 during lifting and thus drags along said wall until the good 26f is completely lifted out of the container 9a.

FIGS. 4 and 5 show the picking of a good 26*f* of a first type. Goods 26*f* of the second type, in contrast, are differently picked by the gripping unit 4. In particular, when a good 26*f* of the second type is picked, a contact plane of the suction gripper 5 is less strongly tilted in relation to the gripping surface of the good 26*f* than when a good 26*f* of the first type is picked. In concrete terms, the angle between said contact plane and said gripping surface amounts to less than 20° for goods of the second type, whereas the respective angle can amount to more than 70° for goods of the first type. Moreover, a good 26*f* of the second type is usually removed from the loading aid 9*a* without pressure on the side wall 28 of loading aid 9*a* when it is picked.

Figure 6:
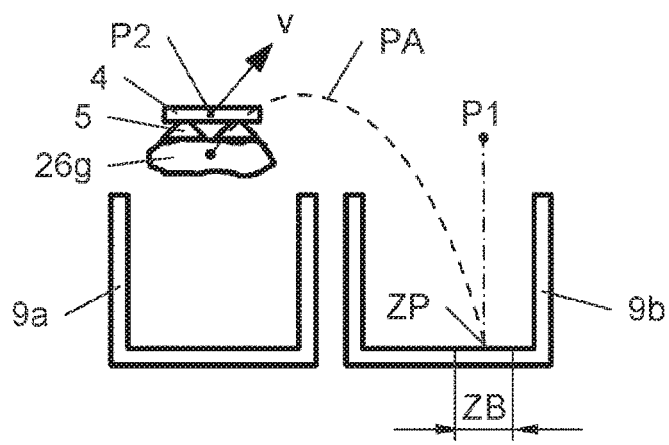

FIG. 6 shows an example for throwing a good 26*g* into the second goods carrier 9*b*. In concrete terms, FIG. 6 shows a first loading aid 9*a* as well as a second loading aid 9*b* in a state in which the good 26*g* has been removed from the first loading aid 9*a* and is now held by the gripping unit 4.

For throwing the good 26*g*, it would be conceivable that the gripping unit 4 is moved to the position P1 located vertically above the target position ZP and the good 26*g* is then released by the gripping unit 4 and falls into the second loading aid 9*b*. Since falling down of the good 26*g* is accompanied and/or influenced by conditions that are not within the range of influence of the robot 1*a*, 1*b*, a target region ZB instead of a precise target position ZP is provided for the good 26*g*.

It is also conceivable that the good 26*g* is moved to a releasing position P2 with the aid of the robot 1*a*, 1*b*, said position being located vertically above and laterally besides a target position ZP calculated for the good or vertically above and laterally besides a target region ZB calculated for the good 26*g*. Moreover, the releasing position P2 is located at the starting point of a trajectory parabola PA which leads to said target position ZP/to said target region ZB and for the calculation of which trajectory parabola PA at least the speed of motion v of the gripping unit 4 (in its amount and direction) at the releasing position P2 is taken as a basis. Accordingly, the good 26*g* travels the path leading along the trajectory parabola PA alone and without being held by the gripping unit 4. Since this motion of the good 26*g* is also accompanied and/or influenced by conditions that are not within the range of influence of the robot 1*a*, 1*b*, a target region ZB instead of a precise target position ZP is again provided for the good 26*g*.

In particular, the direction of motion of the gripping unit 4 and/or the speed of motion v at the releasing position P2 is directed obliquely upwards, as is shown in FIG. 6. Hence, the good 26*g* can be thrown relatively far. However, it would also be conceivable that the speed of motion v points into a different direction, for example into the horizontal direction. By the suggested measures, the path which the gripping unit 4 must travel to throw a good 26*g* can be strongly reduced.

The approach presented in FIG. 6 is suitable for goods 26*g* of the first type. Goods 26*g* of the second type, in contrast, are preferably placed down in the loading aid 9*b*, i.e. lowered with the aid of the gripping unit 4 until the goods 26*g* are supported by the bottom of the loading aid 9*b* or by other goods 26*a* . . . 26*f* already lying in the loading aid 9*b* before the suction grippers 5 are deactivated. It is also conceivable that even goods 26*g* of the second type are dropped into the loading aid 9*b* (from a low height). In particular, a height of fall for the goods 26*g* of the second type amounts to less than 10 cm, whereas the height of fall for the goods 26*g* of the first type amounts to more than 10 cm. In particular, goods 26*g* having geometric shapes which are well-suited for stacking, are placed down in the second goods carrier 9*b* such that a high packing density is allowed for. Such goods 26*g* in particular have flat boundary surfaces and are in particular cuboid.

FIGS. 4 to 6 refer to the containers 9*a*, 9*b*. However, of course, the disclosed teaching can also be applied to the containers 9*c* . . . 9*e* as well as to the conveying devices 10*a*, 10*b*, 19, 20*a*, 20*b*, 24, 25 without any restriction.

Furthermore, it is particularly advantageous if unintended dropping of the goods 26*a* . . . 26*g* picked by the gripping unit 4 as well as unintended placing down/throwing of a good 26*a* . . . 26*g* outside a 26*a* . . . 26*g* tolerance region around the calculated target position ZP of said good 26*a* . . . 26*g* is assessed as an error, and the speed and/or acceleration of the gripping unit 4 is reduced if the number of errors per time unit exceeds a first settable threshold and/or is increased if the number of errors per time unit comes below a second settable threshold. Hence, the method for loading/order-picking of goods 26*a* . . . 26*g* can be adjusted adaptively to changing conditions. To do so, properties of goods 26*a* . . . 26*g* and their suitability for being picked by the gripping unit 4 do not need to be intricately determined but the circumstance that this suitability can be read from the temporal rate of occurring errors is made use of. Thus, an optimum for the loading speed and/or the order-picking speed at the set error rate is always achieved.

At this point, it should be noted that goods 26*a* . . . 26*fg* of the first type and goods 26*a* . . . 26*g* of the second type can in particular be picked and placed down/thrown by means of the same gripping unit 4 in the context of the operations described above. Hence, time for changing the gripping unit 4 can be saved and loading/order-picking of goods 26*a* . . . 26*g* can be carried out quickly.

Finally, it should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or less components than those shown. In some cases, the shown devices and/or their components may not be depicted to scale and/or be enlarged and/or reduced in size.

LIST OF REFERENCE NUMBERS

1*a*, 1*b* robot
2*a* . . . 2*d* robot system
3 robot base
4 gripping unit
5 suction gripper
6 first robot arm segment
7 second robot arm segment
8*a* . . . 8*c* camera (sensor system)
9*a* . . . 9*e* container (goods carrier)
10*a* first conveying path (goods carrier)
10*b* second conveying path (goods carrier)
11*a*, 11*b* robot controller
12 robot database
13 central computer
14 central database
15 storage and order-picking system
16 building wall
17 incoming goods department
18 outgoing goods department 19 first conveying path (goods carrier)
20a, 20b second conveying path (goods carrier)
21 storage area
22 storage rack
23a, 23b storage and retrieval unit
24 third conveying path (goods carrier)
25 fourth conveying path (goods carrier)
26a . . . 26g good(s)
27 bottom
28 side wall
29 gripping surface
p pressure exerted by the gripping unit
P1, P2 releasing position
PA trajectory parabola
V speed of the gripping unit at the releasing position
ZB target region
ZP target position

The invention claimed is:

1. A method for controlling a robot in a storage and order-picking system, the robot having a robot base and a gripping unit movable in relation to the robot base, the method comprising the steps:
distinguishing the goods with respect to one or a combination of physical parameters: dimensional stability, compressive stability, flexural rigidity, strength, absolute weight and/or specific weight at least into goods of a first type and goods of a second type,
prior to picking a good, determining a type of the good,
picking the good from or out of a first goods carrier and placing the good so picked down in or on, or throwing the good so picked into or onto, a second goods carrier by the gripping unit,
wherein the robot and/or the gripping unit is controlled depending on the type determined for a good and such that a good of the goods of the first type is thrown into or onto the second goods carrier and a good of the goods of the second type is placed down in or on the second goods carrier.

2. The method according to claim 1, wherein the method further comprises the step:
providing a program for controlling the robot and/or the gripping unit, wherein the program contains at least two program branches, and wherein, based on the type of the good to be picked, a program branch intended for the type is run through.

3. The method according to claim 1, wherein the method further comprises the steps:
storing in a database motion parameters for the robot, which are assigned to physical properties and/or to types of the goods,
reading from the database a motion parameter for the robot using the type of the goods to be picked, and
controlling the motion of the robot using the motion parameter read from the database.

4. The method according to claim 1, wherein the method further comprises the step:
determining a physical property and/or the type of the good by a sensor system.

5. The method according to claim 1, wherein the method further comprises the steps:
providing a central computer,
providing a physical property and/or the type of the good placed in or on the first goods carrier by the central computer, and/or
providing a motion parameter for the robot assigned to a physical property and/or the type of the good placed in or on the first goods carrier by the central computer.

6. The method according to claim 1, wherein the method further comprises the step:
additionally distinguishing the goods at least into the first type and the second type according to their size and/or their geometric shape.

7. The method according to claim 1, wherein the method further comprises the step:
additionally distinguishing the goods into at least one of the first type and at least one of the second type based on a threshold which is assigned to a physical parameter.

8. The method according to claim 1, wherein the gripping unit comprises at least one suction gripper and the method further comprises the steps:
activating the at least one suction gripper prior to the contact of the at least one suction gripper with the good when picking the good of the first type, and
activating the at least one suction gripper after the contact of the at least one suction gripper with the good when picking the good of the second type.

9. The method according to claim 1, wherein the gripping unit comprises at least one suction gripper and the method further comprises the steps:
tilting a contact plane of the at least one suction gripper by up to 70° in relation to a gripping surface of the good when picking the good of the first type, and
tilting the contact plane by a maximum of 20° in relation to the gripping surface of the good when picking the good of the second type.

10. The method according to claim 1, wherein the method further comprises the steps:
preventing a collision of the gripping unit with another good than the good to be picked when the other good is the good of the second type, and
allowing a collision of the gripping unit with another good other than the good to be picked when the other good is the good of the first type.

11. The method according to claim 1, wherein the method further comprises the steps:
controlling a speed of the gripping unit such that a maximum speed of the gripping unit is higher for the goods of the first type than for the goods of the second type, and/or
controlling an acceleration of the gripping nit unit such that a maximum acceleration of the gripping unit is higher for the goods of the first type than for the goods of the second type.

12. The method according to claim 1, wherein the method further comprises the steps:
calculating a specific target position in or on the second goods carrier for the goods of the second type, and
calculating a target region with multiple possible target positions in or on the second goods carrier for the goods of the first type.

13. The method according to claim 1, wherein the method further comprises the steps:
moving the good of the first type by the robot vertically above a target position calculated for the good and afterwards releasing the good, or
moving the good of the first type vertically above a target region calculated for the good by the robot and afterwards releasing the good.

14. The method according to claim 1, wherein the method further comprises the step:
moving the good of the first type to a releasing position by the robot and releasing there, wherein the releasing position is located vertically above and laterally beside a target position calculated for the good or vertically above and laterally beside a target region calculated for the good, as well as at the starting point of a trajectory parabola leading to the target position or into the target region, and wherein for the calculation of the trajectory parabola at least the speed of motion and the direction of motion of the gripping unit at the releasing position are taken into consideration.

15. The method according to claim 1, wherein the method further comprises the steps:
   assessing an unintended dropping of the good picked by the gripping unit and assessing an unintended placing down or throwing of the good outside a tolerance region around a calculated target position of the good as an error, and
   reducing the speed and/or acceleration of the gripping unit when the number of errors per time unit exceeds a first settable threshold and/or increasing the speed and/or acceleration of the gripping unit when the number of errors per time unit comes below a second settable threshold.

16. The method according to claim 1, wherein the good of the first type is easily deformable and the good of the second type is difficult to deform.

17. The method according to claim 1, wherein the good of the first type is soft or resilient and the good of the second type is hard or rigid.

18. The method according to claim 1, wherein the good of the first type is flexurally limp and the good of the second type is flexurally rigid.

19. The method according to claim 1, wherein the good of the first type is unbreakable and the good of the second type is fragile.

20. The method according to claim 1, wherein the good of the first type is light and the good of the second type is heavy.

21. The method according to claim 1, wherein the good of the first type is light in specific weight and the good of the second type is heavy in specific weight.

22. The method according to claim 1, wherein the good of the first type is small and the good of the second type is large.

23. The method according to claim 1, wherein the first goods carrier and/or the second goods carrier is designed as a loading aid or a conveying device.

24. The method according to claim 23, the loading aid having a bottom, side walls rising up from the bottom and a loading opening bounded by the side walls.

25. The method according to claim 24, wherein the method further comprises the steps:
   pressing the good of the first type lying adjacent to at least one of the side walls of the loading aid against the at least one of the side walls when the good of the first type is picked, and
   removing the good of the second type lying adjacent to at least one of the side walls of the loading aid from the loading aid without any pressure on the at least one of the side walls when the good of the second type is picked.

26. The method according to claim 1, wherein the good of the first type and the good of the second type are picked and placed down or thrown by the same gripping unit.

27. The method according to claim 1, wherein the good is picked according to an order, and the method further comprises the steps:
   transporting the good to be picked to the robot with the first goods carrier,
   transferring the good to be picked from or out of the first goods carrier into or onto the second goods carrier by the robot, and
   transporting away from the robot the good transferred into or onto the second goods carrier with the second goods carrier.

28. A robot system, comprising:
   a robot having a robot base and a gripping unit movable in relation to the robot base, the robot being designed for picking a good from or out of a first goods carrier and placing the good so picked in or on, or throwing the good so picked into or onto, a second goods carrier using the gripping unit,
   and
   a robot controller configured
   for instructing the robot to pick the good from or out of the first goods carrier and to place the good so picked in or on, or throw the good so picked into or onto the second goods carrier, and
   for controlling the robot and/or the gripping unit differently depending on a determined type of the goods, such that a good of the goods of a first type is thrown into or onto the second goods carrier and a good of the goods of a second type are is placed in or on the second goods carrier.

29. The robot system according to claim 28, wherein a program for controlling the robot and/or the gripping unit is stored in the robot controller, the program containing at least two program branches, wherein, based on a type of a good to be picked, a program branch intended for the type is run through.

30. The robot system according to claim 28, further comprising:
   a robot database in which motion parameters for the robot are stored, the motion parameters being assigned to the physical properties and/or to types of the goods and being provided for controlling the motion of the robot and/or the gripping unit, wherein the goods are distinguished by one or a combination of the physical parameters: dimensional stability, compressive stability, flexural rigidity, strength, absolute weight and/or specific weight at least into the goods of the first type and the goods of the second type.

31. The robot system according to claim 28, further comprising:
   a sensor system for determining a physical property and/or the type of the good.

32. The robot system according to claim 28, further comprising:
   an interface to a central computer of a storage and order-picking system, the interface providing
   a physical property and/or the type of the good placed in or on a first goods carrier and/or
   a motion parameter for the robot assigned to the physical property and/or the type of the good placed in or on a first goods carrier,
   for the robot.

33. The robot system according to claim 31, wherein the sensor system comprises a camera and/or a scale and/or a barcode scanner and/or an RFID reader and/or a room depth sensor and/or a laser scanner and/or an ultrasonic sensor.

34. The robot system according to claim 28, wherein the gripping unit comprises at least one suction gripper.

35. The robot system according to claim 28, wherein the robot is designed as a jointed-arm robot or a gantry robot.

36. A storage and order-picking system for order-picking of goods comprising:
 a storage area for storing the goods,
 a working area for picking or repacking goods, and
 a robot system arranged in the working area and designed according to claim 28.

37. The storage and order-picking system according to claim 36, further comprising:
 a first conveying device configured to transport the goods in or on first goods carriers from the storage area to the robot, and
 a second conveying device configured to transport the goods in or on second goods carriers away from the robot,
 wherein the working area is designed for fully automated order-picking of the goods, and
 wherein the robot is designed to pick at least one good from or out of the first goods carrier for an order and to place the at least one good so picked in or on, or throw the at least one good so picked into or onto, the second goods carrier for the order.

38. The storage and order-picking system according to claim 36, further comprising:
 a central computer of the storage and order-picking system connected with the robot system, the central computer providing a physical property and/or the type of the good placed in or on the first goods carrier.

39. The storage and order-picking system according to claim 38, further comprising:
 a central database connected with the central computer of the storage and order-picking system, the central database storing motion parameters for the robot, the motion parameters being assigned to the physical properties and/or to the first and second types of goods and being provided for controlling the motion of the robot and/or the gripping unit, wherein the goods are distinguished by one or a combination of the physical parameters: dimensional stability, compressive stability, flexural rigidity, strength, absolute weight and/or specific weight at least into the goods of the first type and the goods of the second type.

40. The storage and order-picking system according to claim 38, further comprising:
 a central database connected with the central computer of the storage and order-picking system, the central database storing physical parameters of the goods selected from the group of dimensional stability, compressive stability, flexural rigidity, strength, absolute weight and/or specific weight.

* * * * *

UNITED STATES PATENT AND TRADEMARK OFFICE
CERTIFICATE OF CORRECTION

PATENT NO. : 12,037,194 B2
APPLICATION NO. : 16/978232
DATED : July 16, 2024
INVENTOR(S) : Maximilian Beinhofer et al.

It is certified that error appears in the above-identified patent and that said Letters Patent is hereby corrected as shown below:

In the Claims

In Claim 11, Line 7 (Column 24, Line 44): after "gripping" please delete "nit"

In Claim 28, Line 18 (Column 26, Line 24): after "type" please delete "are"

Signed and Sealed this
Thirteenth Day of August, 2024

Katherine Kelly Vidal
*Director of the United States Patent and Trademark Office*